June 28, 1960 E. F. FRASER 2,942,922
CUTTING BOARD CONSTRUCTION
Filed July 10, 1958
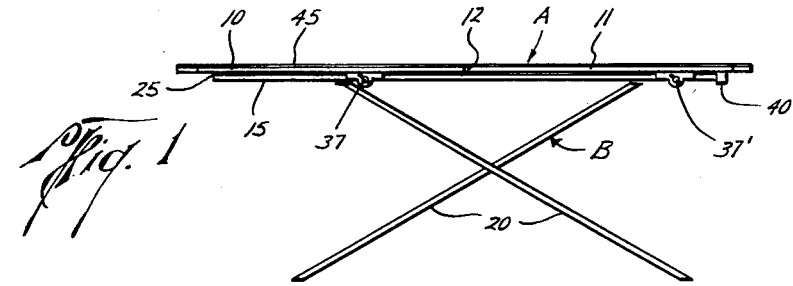
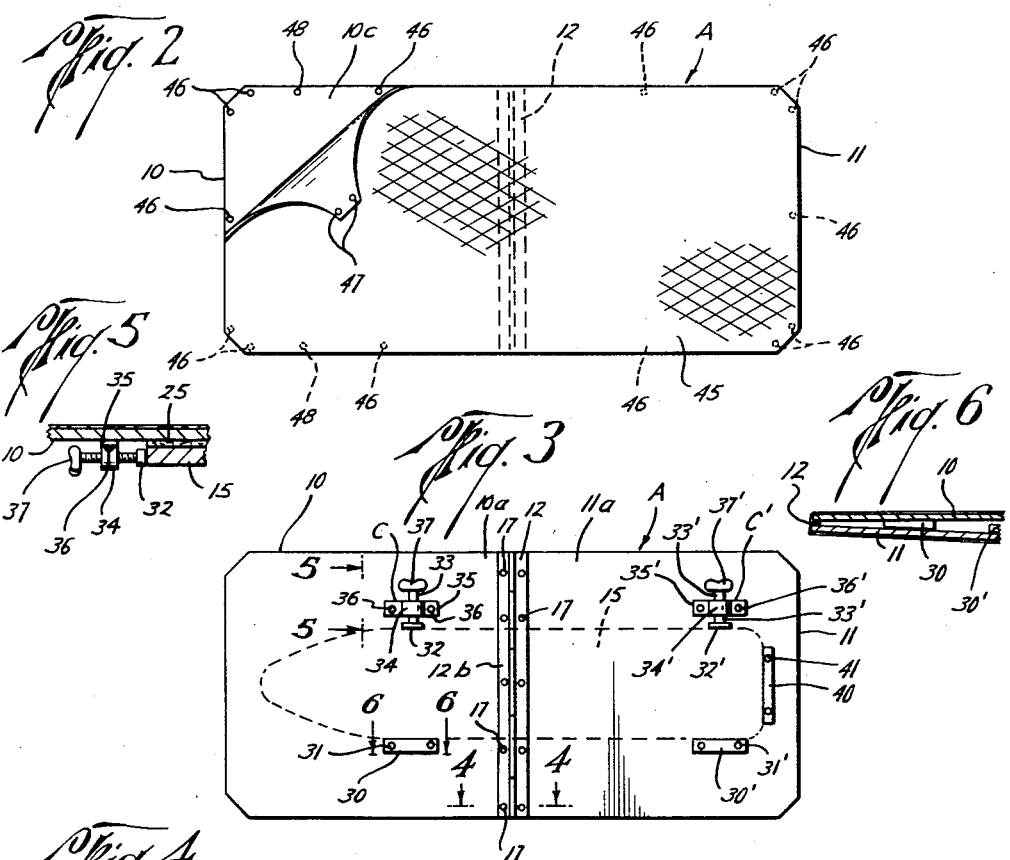
Edith F. Fraser
INVENTOR.
BY Hayden & Prawel
ATTORNEYS United States Patent Office
2,942,922
Patented June 28, 1960

2,942,922
CUTTING BOARD CONSTRUCTION
Edith F. Fraser, 126 Atlantic St., Corpus Christi, Tex.
Filed July 10, 1958, Ser. No. 747,630
1 Claim. (Cl. 311—106)

This invention relates to cutting board constructions, and particularly to cutting board constructions for attachment to an ironing board.

An object of this invention is to provide a new and improved cutting board construction which is particularly suitable for use in the laying out and the cutting of cloth or other material for dresses and the like.

Another object of this invention is to provide a new and improved cutting board construction for use in the making of dresses and the like, wherein such construction is adapted for attachment to an ironing board having a leg structure which is vertically adjustable so that the surface of the cutting board can be positioned for use at selected heights so that the user does not need to bend over appreciably while using the cutting board.

An important object of this invention is to provide a new and improved cutting board construction which is formed in a plurality of sections having hinge means connecting same for folding and unfolding so that the cutting board is approximately the size of a card table when folded and forms a flat level upper surface when unfolded, and which is provided with clamping means on each side of the hinge means for clamping the sections to an ironing board top when the sections are unfolded for holding the unfolded sections level on the ironing board top during use.

A further object of this invention is to provide a new and improved cutting board which is of a sufficient size to receive a dress or the like when the cutting board is mounted on a conventional ironing board and which may be folded into a size approximately the same as a bridge table for convenient storage.

Still another object of this invention is to provide a new and improved cutting board construction for mounting on an ironing board wherein the upper surface of said cutting board construction is provided with attachment means for attaching a pad thereon on which the material for a dress may be laid out for ironing or pressing before placing a pattern on the material for the cutting operation.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

Fig. 1 is an elevation illustrating the cutting board construction of this invention in position for use on an ironing board;

Fig. 2 is a plan view of the cutting board construction of this invention with a portion of the pad pulled back to show the attachment means therefor;

Fig. 3 is a view looking at the lower surface or bottom of the cutting board construction of this invention, with the ironing board top shown in position in dotted lines;

Fig. 4 is a sectional view taken on line 4—4 of Fig. 3;
Fig. 5 is a sectional view taken on line 5—5 of Fig. 3; and
Fig. 6 is a fragmentary sectional view showing the cutting board in a folded condition for storage.

In the drawings, the letter A designates generally the cutting board or cutting board construction of this invention which is adapted to be mounted on an ironing board B. Briefly, the cutting board A of this invention is formed of a pair of cutting board sections 10 and 11 which are joined together with a hinge 12 so that the sections 10 and 11 may be extended longitudinally to form an upper level surface when the sections are positioned on the top 15 of the ironing board B. When the sections 10 and 11 are extended in the unfolded position illustrated in Fig. 1 of the drawings, they are of sufficient length and width to conveniently handle dresses and the like when laying the material for such dresses out and when cutting such material to make the dresses. Also, the combined sections 10 and 11 provide a sufficiently large area so that the material for dress or the like may be laid upon such sections 10 and 11 for ironing, pressing, or similar purposes prior to placing a pattern on the material for cutting the material to the desired shape. On the other hand, with the hinge 12 connecting the sections 10 and 11, such sections 10 and 11 may be folded towards each other (Fig. 6) to a compact size which is approximately equal to the size of the ordinary bridge table.

Considering the invention more in detail, the sections 10 and 11 are preferably of the same size so that when they are folded together about the hinge 12, they form a relatively compact package which is about the size of an ordinary bridge table. When the sections 10 and 11 are fully extended or are unfolded as shown in Fig. 1 of the drawings, the full length of the cutting board A is preferably about 60" and the width is about 36". Of course, it will be appreciated by those skilled in the art that the dimensions of the cutting board A may vary without departing from the scope of this invention.

The hinge 12 is provided with a central hinge pin 12a and side flaps 12b and 12c (Figs. 3 and 4). In normal circumstances, the hinge 12 would be a hinge of the type known as a piano hinge or any other suitable hinge which is relatively thin, but extends laterally with respect to the longitudinal length of the cutting board A. The hinge flap 12b is connected to the lower surface 10a (Fig. 4) and the hinge flap 12c is connected with the lower surface 11a of the section 11 by means of screws 17 or any other suitable securing means. The hinge 12 is mounted below the adjacent laterally extending edges 10b and 11b of the cutting board sections 10 and 11, respectively, so that such surfaces 10b and 11b are in abutment when the hinge 12 is unfolded (Fig. 4). When the ends 10b and 11b are in abutment with each other in the unfolded position shown in Fig. 4 of the drawings, the upper surfaces 10c and 11c of the sections 10 and 11, respectively, are in alignment with each other.

As previously pointed out, the cutting board construction A of this invention is adapted to be positioned on the top 15 of an ironing board B. The details of the construction of the ironing board B are not illustrated since the ironing board B may be any conventional ironing board, but preferably such ironing board B is one which has legs 20 which are adjustable as to height so that the height of the cutter board construction A can be adjusted for the particular user so that the user does not need to bend over appreciably while using the cutting board A. The legs 20 of the ironing board B are secured in any known manner to the ironing board top 15, and preferably, a conventional ironing board cover or pad 25 (Fig. 4) is included on the top of the ironing board table top 15. The pad 25 is sufficiently thick enough and soft enough so that the hinge 12 can sink down into the pad 25 to prevent the central portion of the cutting board A from being raised or forced upwardly to an unlevel condition. However, if the pad 25 is not used, the hinge 12 may be recessed in the cutting board sections 10 and 11 so that it is flush with the lower surfaces 10a and 11a.

The cutting board section 10 has a clamping means C mounted on its lower surface 10a and the cutting board section 11 has an identical clamping means C' mounted on its bottom or lower surface 11a. The clamping means C includes a fixed clamping block 30 which is secured to the lower surface 10a with screws 31 or other similar securing means. The clamping block 30 is adapted to contact one side of the ironing board top 15 (Fig. 3). The other side of the ironing board top 15 is engaged by a clamping head 32 which is mounted on a threaded shaft or bolt 33. The threaded shaft or bolt 33 extends through a nut 34 which is mounted with flanges 35 and screws or other suitable securing means 36 to the lower surface 10a of the cutting board section 10. A thumb plate 37 is provided on the threaded shaft 33 so that the shaft 33 can be rotated in the nut 34 to move the clamping head 32 relative to the ironing board top 15 for applying a clamping force to the top 15 as desired. The clamping force is applied to the top 15 in a lateral direction which is substantially parallel with the laterally extending hinge 12 so that there is no tendency to cause the hinge 12 to buckle upwardly when the pressure is applied with the clamping means C for clamping the section 10 to the top 15. The clamping means C' is preferably identical with the clamping means C and the parts thereof are designated with the same numerals except for the addition of a prime mark.

The clamping means C is positioned longitudinally from the hinge 12 and the clamping means C' is also positioned longitudinally from the hinge 12, but as best seen in Fig. 3 of the drawings, the clamping means C' is spaced from the hinge 12 a greater longitudinal distance than the clamping means C so that when the sections 10 and 11 are folded towards each other, the clamping means C can fit into the longitudinal space between the clamping means C' and the hinge 12, whereby no interfering contact between the clamping means C and C' is caused when the sections 10 and 11 are folded. The clamping blocks 30 and 30' are in the same longitudinal positions relative to said hinge 12 as said clamping means C and C', respectively. Furthermore, the block 30 has its lower surface inclined or wedge shaped (Fig. 6) so that the sections 10 and 11 can fold as closely together as possible for storage.

It should be observed that the clamping heads 32 and 32' engage the sides of the ironing board top 15. This feature is particularly valuable in instances in which the ironing board top 15 is formed with a relatively thin edge of metal so that a clamping mechanism which clamps underneath the top 15 could not be used.

It is desirable to also have a fixed positioning block 40 mounted on the lower surface 11a of the cutting board section 11 with screws 41 or other suitable securing means so as to make it easy to position the cutting board A longitudinally on the ironing board top 15 without requiring the user to actually look underneath the cutting board A. However, it will be appreciated that the block or stop 40 can be eliminated if desired.

The cutting board construction A may be used without a pad on the upper surfaces 10c and 11c, but particularly where it is desired to iron on the cutting table A after a dress or other article has been completed, a pad such as the pad 45 would be provided. The pad 45 would be formed of any of the known quilted pad materials or any other suitable padding. In the preferred form of the invention the pad 45 is attached to the upper surfaces 10c and 11c with snap buttons 46 and 47 which cooperate with each other in the known manner to releasably hold the pad 45 on the sections 10 and 11. An extra set of snap buttons 48 are provided on the upper surface 10c so that when it is desired to fold the sections 10 and 11 towards each other to the folded position, the buttons 46 and 47 on the section 10 and the half of the pad 45 overlaying the section 10 are released from each other, and then the end snap buttons 47 on the pad 45 are snapped into connection with the snaps 48. That makes the left half of the pad 45 as viewed in Fig. 2 slack or loose so that there is sufficient material to permit a folding of the section 10 and 11 to the folded position without tearing or applying a strain on the pad 45 and without completely disconnecting the pad 45 from the cutting board A.

In the operation or use of the cutting board A of this invention, the cutting board sections 10 and 11 are positioned with the hinge 12 unfolded as seen in Figs. 1–4 of the drawings. In such unfolded condition, the board A is moved until the blocks 30, 30' and 40 engage with the edges of the ironing board top 15. The user then applies a slight amount of pressure with one hand at the hinge 12 to firmly press the hinge 12 into the pad 25 as illustrated in Fig. 4 so that the top surface of the cutting board A is level. Then, with the other hand, the thumb screws or bolts 33 and 33' are threaded in the nuts 34 and 34', respectively, to tighten the heads 32 and 32' in engagement with one side of the ironing board top 15 to firmly clamp the cutting board sections 10 and 11 to the ironing board top 15. The clamping force from the clamping means C and C' is substantially parallel to the hinge 12 and therefore there is no buckling action exerted on the hinge 12 by the clamps C and C'. By spacing the clamping means C and C' longitudinally on each side of the hinge 12, an upward buckling or folding of the sections 10 and 11 towards each other is prevented. A downward buckling or movement of the sections 10 and 11 about the hinge 12 is prevented because of the abutment of the edges 10b and 11b of the cutting board sections 10 and 11 (Fig. 4). Therefore, the cutting board sections 10 and 11 are firmly and securely clamped to the top 15 of the ironing board B. If the end buttons 47 were previously snapped or connected to the snap connections 48, then they are released and the entire half of the pad 45 is snapped to the buttons 46 so that the pad 45 is then flat and level on the flat and level surface of the sections 10 and 11. A cutting board is thus provided which is of sufficient size to cut out and piece together sections of cloth or other material for making of dresses and the like. When the dress is completed, the surface of the cutting board A is sufficiently large so that the dress or the like may be placed entirely thereon for ironing if desired.

When it is desired to remove the cutting board A from the ironing board B, the pad 45 is unsnapped or disconnected from the snaps or other connections 46 on the half overlaying the section 10, as previously explained and the end snaps or connection members 47 are snapped or are otherwise connected to the snaps or other connection means 48. That provides the slack or looseness in the pad 45 to permit the subsequent folding of the sections 10 and 11 towards each other without damaging the pad 45 and without requiring the complete removal of the pad 45 from the sections 10 and 11. With the pad 45 thus connected, the clamping means C and C' are released by turning the thumb screws or threaded bolts 33 and 33' to release the clamping heads 32 and 32' from engagement with the sides of the top 15 of the ironing board B. Then the cutting board A is completely removed from the ironing board B and the cutting board sections 10 and 11 are folded towards each other about the hinge 12 so that they are folded together to occupy an area approximately the size of an average bridge table, as previously explained.

The foregoing disclosure and description of the invention is illustrative and explanatory thereof and various changes in the size, shape and materials, as well as in the details of the illustrated construction, may be made within the scope of the appended claim without departing from the spirit of the invention.

What is claimed is:

A cutting board construction adapted to be mounted on an ironing board, comprising a pair of cutting board sections, said sections being adapted to be positioned longitudinally on an ironing board top with the adjacent laterally extending edges of said sections in abutment with each other, a hinge connected to said sections on the lower surfaces thereof and extending for substantially the full width of each of said sections along said edges which are in abutment for permitting said sections to be folded towards each other for compactness when in storage, an adjustable clamping member extending substantially parallel to said hinge on each of said sections and longitudinally spaced from said hinge for engagement with one side of said ironing table top for applying a clamping force to the ironing board top in a lateral direction substantially parallel to said hinge, and a fixed clamping block on each of said sections positioned for engagement with the other side of said ironing table top whereby said sections are tightly clamped to said top upon a tightening of said adjustable clamping members when said adjustable clamping members and said fixed clamping members are in engagement with the sides of the ironing board top.

References Cited in the file of this patent
UNITED STATES PATENTS

| | | |
|---|---|---|
| 949,646 | Call | Feb. 15, 1910 |
| 1,413,111 | Ericker | Apr. 18, 1922 |
| 1,888,478 | Steidl | Nov. 22, 1932 |
| 1,904,897 | Kahrs | Apr. 18, 1933 |
| 1,921,645 | Williams | Aug. 8, 1933 |
| 2,468,962 | Czak | May 3, 1949 |
| 2,529,051 | Sherman | Nov. 7, 1950 |
| 2,556,943 | Reisman | June 12, 1951 |